United States Patent
Ishizeki et al.

(10) Patent No.: US 10,355,632 B2
(45) Date of Patent: Jul. 16, 2019

(54) POWER CONVERTER CONTROL DEVICE

(71) Applicant: DAIKIN INDUSTRIES, LTD., Osaka-shi, Osaka (JP)

(72) Inventors: Shinichi Ishizeki, Osaka (JP); Nobuyasu Hiraoka, Osaka (JP)

(73) Assignee: DAIKIN INDUSTRIES, LTD., Osaka-Shi, Osaka (JP)

(*) Notice: Subject to any disclaimer, the term of this patent is extended or adjusted under 35 U.S.C. 154(b) by 0 days.

(21) Appl. No.: 16/061,608

(22) PCT Filed: Nov. 10, 2016

(86) PCT No.: PCT/JP2016/083336
§ 371 (c)(1),
(2) Date: Jun. 12, 2018

(87) PCT Pub. No.: WO2017/115560
PCT Pub. Date: Jul. 6, 2017

(65) Prior Publication Data
US 2018/0367080 A1 Dec. 20, 2018

(30) Foreign Application Priority Data
Dec. 28, 2015 (JP) ................... 2015-256350

(51) Int. Cl.
*H02M 5/458* (2006.01)
*H02P 27/06* (2006.01)
(Continued)

(52) U.S. Cl.
CPC .......... *H02P 27/06* (2013.01); *H02M 3/1582* (2013.01); *H02M 5/458* (2013.01);
(Continued)

(58) Field of Classification Search
CPC ........ H02M 5/4585; H02M 7/00; H02M 1/00; H02M 3/00; H02M 11/00; H02P 27/06
See application file for complete search history.

(56) References Cited

U.S. PATENT DOCUMENTS 5,359,278 A * 10/1994 Notohara ................ G05F 1/613
323/222
5,633,793 A * 5/1997 Lee ........................ H02M 7/062
363/127
(Continued)

FOREIGN PATENT DOCUMENTS

| CN | 101027834 A | 8/2007 |
| CN | 104662788 A | 5/2015 |

(Continued)

OTHER PUBLICATIONS

International Search Report (PCT/ISA/210) issued in PCT/JP2016/083336, dated Feb. 7, 2017.

*Primary Examiner* — Eduardo Colon Santana
*Assistant Examiner* — Said Bouziane
(74) *Attorney, Agent, or Firm* — Birch, Stewart, Kolasch & Birch, LLP

(57) ABSTRACT

A discharge switch and a capacitor are connected in series between first and second DC power supply lines. A boost circuit boosts a rectified voltage to charge the capacitor. An inverter receives the rectified voltage as a DC voltage when the discharge switch is not conducting, receives a voltage across the capacitor as the DC voltage when the discharge switch is conducting, converts the DC voltage into an AC voltage, and outputs it to a motor. A switch control unit maintains the discharge switch not conducting over a first time period, and switches the discharge switch between conducting and not conducting in a second time period. A charge and discharge time period setting unit sets the first time period when a rotational speed of the motor is higher
(Continued)

than a speed threshold shorter than the first time period when the rotational speed is lower than the speed threshold.

8 Claims, 4 Drawing Sheets

(51) Int. Cl.
*H02M 7/06* (2006.01)
*H02M 7/48* (2007.01)
*H02M 3/158* (2006.01)
*H02M 7/797* (2006.01)
*H02M 1/00* (2006.01)

(52) U.S. Cl.
CPC .......... *H02M 5/4585* (2013.01); *H02M 7/06* (2013.01); *H02M 7/48* (2013.01); *H02M 7/797* (2013.01); *H02M 2001/007* (2013.01); *H02P 2201/03* (2013.01); *H02P 2201/07* (2013.01); *H02P 2201/09* (2013.01)

(56) References Cited

U.S. PATENT DOCUMENTS

| | | | |
|---|---|---|---|
| 2008/0265808 A1* | 10/2008 | Sparey | H02P 6/182 |
| | | | 318/139 |
| 2015/0244282 A1 | 8/2015 | Yamashita et al. | |
| 2016/0233782 A1 | 8/2016 | Sakakibara | |
| 2016/0248335 A1 | 8/2016 | Sakakibara | |
| 2016/0294300 A1 | 10/2016 | Sakakibara et al. | |
| 2017/0141693 A1* | 5/2017 | Rahnamaee | H02M 7/4826 |

FOREIGN PATENT DOCUMENTS

| | | | | |
|---|---|---|---|---|
| JP | 2004-229409 | A | | 8/2004 |
| JP | 2011-193678 | A | | 9/2011 |
| JP | 2011193678 | A | * | 9/2011 |
| JP | 2012-135184 | A | | 7/2012 |
| JP | 2015-65731 | A | | 4/2015 |
| JP | 2015-76921 | A | | 4/2015 |
| JP | 2015-84637 | A | | 4/2015 |

* cited by examiner

FIRST SCHEME

SECOND SCHEME

POWER CONVERTER CONTROL DEVICE

TECHNICAL FIELD

The present invention relates to a power converter control device.

BACKGROUND ART

Japanese Patent Application Laid-Open No. 2015-084637, Japanese Patent Application Laid-Open No. 2015-065731 and Japanese Patent Application Laid-Open No. 2015-076921 each disclose a direct power converter. This direct power converter includes a diode rectifier, an inverter, and a charge and discharge circuit.

The diode rectifier full-wave rectifies a single-phase AC voltage, and outputs a rectified voltage after rectification across a pair of DC power supply lines (a DC link).

The charge and discharge circuit is provided to the DC link, and includes a buffer circuit and a boost circuit. The buffer circuit has a switch and a capacitor connected in series to each other between the pair of DC power supply lines. When the switch is conducting, the capacitor discharges to provide power to the DC link.

The boost circuit boosts the rectified voltage from the diode rectifier to charge the capacitor. This allows the charge and discharge circuit to receive power from the DC link. An input voltage (a DC voltage from the DC link) of the inverter matches the boosted voltage for the capacitor when the above-mentioned switch is conducting, and matches the rectified voltage when the switch is not conducting. The inverter receives the DC voltage from the DC link as an input, converts it into an AC voltage, and outputs the AC voltage.

SUMMARY OF INVENTION

Problem to be Solved by Invention

It is desirable to drive a motor with high efficiency.

An object of the present application is thus to provide a direct power converter control device that enables driving of a motor with high efficiency.

Means to Solve the Problem

A first aspect of a power converter control device according to the present invention is a device for controlling, in a power converter including first and second DC power supply lines (LH, LL), a rectifying circuit (3), a discharge switch (Sc) and a capacitor (C4), a boost circuit (4a), and an inverter (5), the discharge switch, the rectifying circuit full-wave rectifying a single-phase AC voltage to a rectified voltage, and applying the rectified voltage across the first and second DC power supply lines, the discharge switch and the capacitor being connected in series to each other between the first and second DC power supply lines, the boost circuit boosting the rectified voltage to charge the capacitor, the inverter receiving, as an input, the rectified voltage as a DC voltage (Vdc1) across the first and second DC power supply lines when the discharge switch is not conducting, receiving, as an input, a voltage across the capacitor as the DC voltage when the discharge switch is conducting, converting the DC voltage as input into an AC voltage, and outputting the AC voltage to a motor (6), the power converter control device including: a switch control unit (11) that maintains the discharge switch not conducting over a first time period (T1), and switches the discharge switch between conducting and not conducting in a second time period (T2) other than the first time period; and a charge and discharge time period setting unit (12) that sets the first time period when a rotational speed of the motor is higher than a speed threshold ($\omega$ref) shorter than the first time period when the rotational speed is lower than the speed threshold.

A second aspect of the power converter control device according to the present invention is the power converter control device according to the first aspect in which, when the rotational speed ($\omega$m) is higher than the speed threshold ($\omega$ref), the first time period (T1) has a length of zero.

A third aspect of the power converter control device according to the present invention is the power converter control device according to the first or second aspect in which, when the rotational speed ($\omega$m) is lower than the speed threshold ($\omega$ref), the first time period (T1) is a time period in which the rectified voltage is greater than a predetermined value.

A fourth aspect of the power converter control device according to the present invention is the power converter control device according to any one of the first to third aspects in which the speed threshold is the rotational speed when amplitude of the AC voltage applied to the motor (6) reaches an upper limit.

Effects of Invention

According to the first and fourth aspects of the power converter control device according to the present invention, the voltage across the capacitor is higher than the rectified voltage, and thus the DC voltage can be higher than the rectified voltage when the discharge switch is conducting.

When the rotational speed is low, the DC voltage can be higher than the rectified voltage as the discharge switch is conducting in the second time period, but the DC voltage matches the rectified voltage as the discharge switch is maintained not conducting in the first time period. That is to say, the DC voltage higher than the rectified voltage cannot be input into the inverter in the first time period.

On the other hand, when the rotational speed is high, the discharge switch is switched between conducting and not conducting in the second time period that is longer. The DC voltage when the rotational speed is high can thus be higher than the DC voltage when the rotational speed is low.

The maximum value of a voltage (maximum output applied voltage) that can be applied to the motor can be increased with increasing second time period, and thus high-speed rotation and high-load operation of the motor can be achieved while suppressing an increase in current of the motor. On the other hand, the DC voltage can become small when the rotational speed is low. A time period in which the discharge switch is conducting (i.e., a period in which the capacitor discharges) is required to be short so that the DC voltage becomes small, and the amount of operation of the boost circuit can become small accordingly. Loss caused in the boost circuit is reduced as the amount of operation of the boost circuit decreases. Efficiency when the rotational speed is low can thus be improved.

As described above, high-load operation can be achieved while suppressing the increase in current of the motor when the rotational speed is high, while efficiency is improved when the rotational speed is low.

According to the second aspect of the power converter control device according to the present invention, the maximum output applied voltage to the motor can be maximized.

According to the third aspect of the power converter control device according to the present invention, the DC voltage can be increased compared with a case where a time period in which the rectified voltage is smaller than a voltage reference value is used as the first time period.

The objects, features, aspects, and advantages of the present invention will become more apparent from the following detailed description and the accompanying drawings.

DESCRIPTION OF EMBODIMENTS

<1. Configuration of Direct Power Converter>

Figure 1:
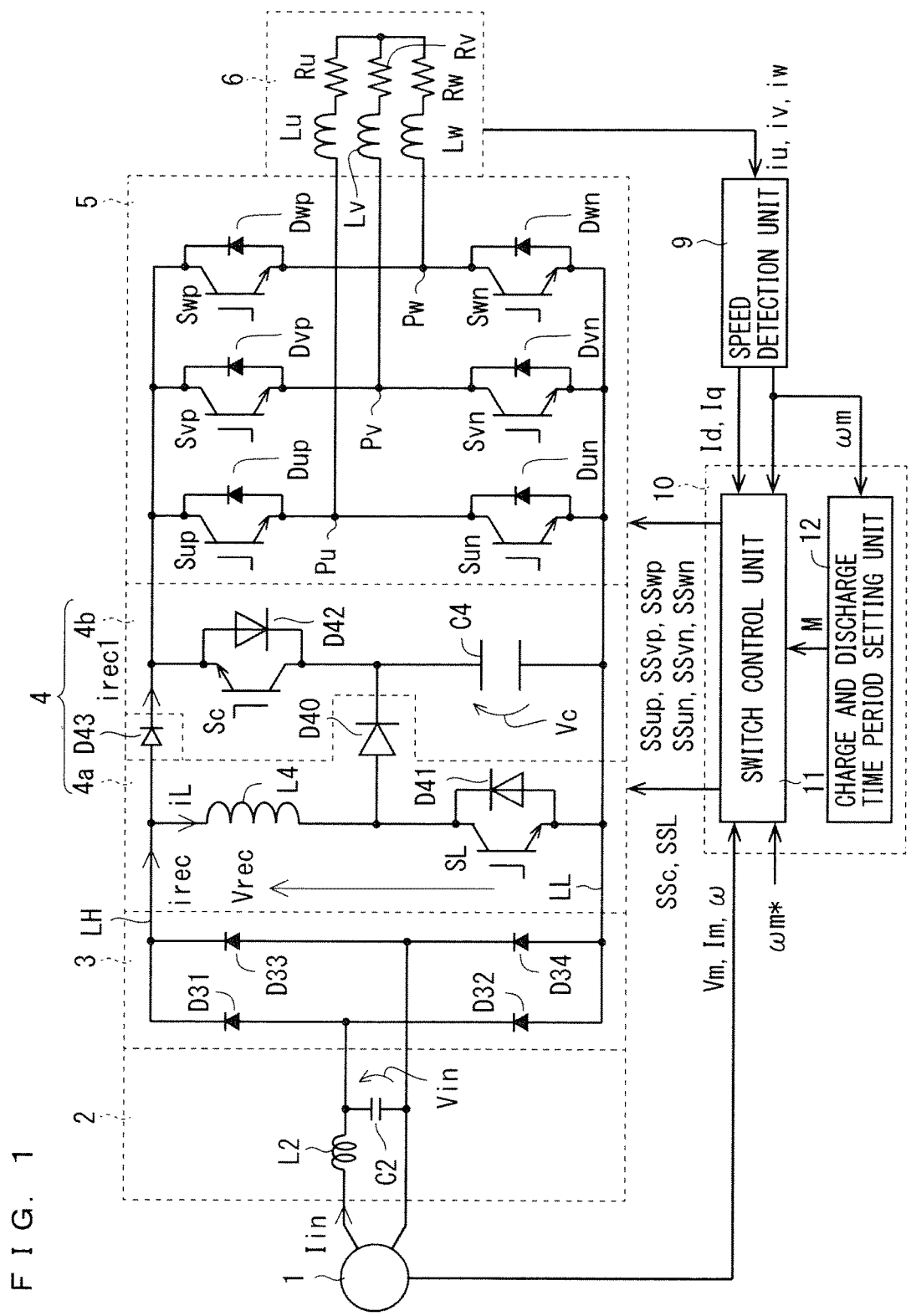
FIG. 1 is a block diagram showing the configuration of a direct power converter to which a control method shown in an embodiment is applied.

FIG. 1 is a block diagram showing the configuration of a direct power converter to which a control method shown in the present embodiment is applied. The direct power converter includes a converter 3, a power buffer circuit 4, and an inverter 5.

The converter 3 is a single-phase rectifying circuit, and is connected to a single-phase AC power supply 1, for example, via a filter 2. The filter 2 includes a reactor L2 and a capacitor C2. The reactor L2 is connected between one of two output terminals of the single-phase AC power supply 1 and the converter 3. The capacitor C2 is connected in series to the reactor L2 between the two output terminals of the single-phase AC power supply 1. The filter 2 removes a high-frequency component of a current. The filter 2 may be omitted. Description will be made below while ignoring the function of the filter 2 for simplicity.

The converter 3 uses, for example, a diode bridge, and includes diodes D31 to D34. The diodes D31 to D34 constitute a bridge circuit, single-phase full-wave rectify a single-phase AC voltage Vin, which is an input voltage input from the single-phase AC power supply 1, to convert it into a rectified voltage Vrec, and output the rectified voltage Vrec across DC power supply lines LH and LL (they form a so-called DC link). A potential higher than that applied to the DC power supply line LL is applied to the DC power supply line LH. An input current Iin flows from the single-phase AC power supply 1 into the converter 3.

The power buffer circuit 4 is a circuit that provides and receives power to and from the DC link, and includes a boost circuit 4a, a buffer circuit 4b, and a diode D43. The buffer circuit 4b includes a capacitor C4. The boost circuit 4a boosts the rectified voltage Vrec to charge the capacitor C4.

The buffer circuit 4b further includes a transistor (herein an insulated-gate bipolar transistor: hereinafter abbreviated as an "IGBT") Sc connected in antiparallel to a diode D42. The transistor Sc is connected in series to the capacitor C4 between the DC power supply lines LH and LL at a side closer to the DC power supply line LH. Herein, connecting A and B in antiparallel refers to connecting A and B in parallel so that a forward direction of A and a forward direction of B are opposite to each other. Specifically, a forward direction of the transistor Sc is a direction from the DC power supply line LL towards the DC power supply line LH, and a forward direction of the diode D42 is a direction from the DC power supply line LH towards the DC power supply line LL. The transistor Sc and the diode D42 can collectively be understood as a single switch element (first switch).

The boost circuit 4a includes a diode D40, a reactor L4, and a transistor (herein an IGBT) SL, for example. The diode D40 includes a cathode and an anode, and the cathode is connected between the first switch and the capacitor C4. The reactor L4 is connected between the DC power supply line LH and the anode of the diode D40. The transistor SL is connected between the DC power supply line LL and the anode of the diode D40. A diode D41 is connected in antiparallel to the transistor SL, and they can collectively be understood as a single switch element (second switch). The boost circuit 4a is known as a so-called boost chopper.

The capacitor C4 is charged by the boost circuit 4a, and a voltage Vc higher than the rectified voltage Vrec is generated across the capacitor C4. Specifically, a current is allowed to flow from the DC power supply line LH to the DC power supply line LL via the second switch to store energy in the reactor L4, and then the second switch is turned off to store the energy in the capacitor C4 via the diode D40. This enables the power buffer circuit 4 to receive power from the DC link.

Since the voltage Vc is higher than the rectified voltage Vrec, a current basically does not flow through the diode D42. Whether the first switch is conducting or not thus depends solely on whether the transistor Sc is conducting or not. Not only the transistor Sc but also the first switch (a discharge switch) including the transistor Sc and the diode D42 is thus hereinafter also referred to as a switch Sc. When the switch Sc is conducting, the capacitor C4 discharges so that the power buffer circuit 4 can provide power to the DC link.

Since the DC power supply line LH is higher in potential than the DC power supply line LL, a current basically does not flow through the diode D41. Whether the second switch is conducting or not thus depends solely on whether the transistor SL is conducting or not. Not only the transistor SL but also the second switch including the transistor SL and the diode D41 is thus hereinafter also referred to as a switch SL.

The diode D43 is connected on the DC power supply line LH between the reactor L4 and the switch Sc. A forward direction of the diode D43 is a direction from the converter 3 towards the inverter 5. The diode D43 prevents a short circuit of the reactor L4 when the switch Sc is turned on, for example.

The inverter 5 converts the DC voltage across the DC power supply lines LH and LL into an AC voltage, and outputs the AC voltage to output terminals Pu, Pv, and Pw. When this is described in terms of power, the inverter 5 receives DC power from the DC link as an input, and outputs AC power to a motor 6. The inverter 5 includes six switching elements Sup, Svp, Swp, Sun, Svn, and Swn. The switching elements Sup, Svp, and Swp are respectively connected between the output terminals Pu, Pv, and Pw and the DC power supply line LH, and the switching elements Sun, Svn, and Swn are respectively connected between the output terminals Pu, Pv, and Pw and the DC power supply line LL.

The inverter 5 forms a so-called voltage source inverter, and includes six diodes Dup, Dvp, Dwp, Dun, Dvn, and Dwn.

The diodes Dup, Dvp, Dwp, Dun, Dvn, and Dwn are arranged with their cathodes being directed towards the DC power supply line LH and their anodes being directed towards the DC power supply line LL. The diode Dup is connected in parallel to the switching element Sup between the output terminal Pu and the DC power supply line LH. Similarly, the diodes Dvp, Dwp, Dun, Dvn, and Dwn are respectively connected in parallel to the switching elements Svp, Swp, Sun, Svn, and Swn.

IGBTs are used as the switching elements Sup, Svp, Swp, Sun, Svn, and Swn, for example.

The AC voltage is applied from the inverter 5 to the motor 6. The motor 6 rotates in accordance with the AC voltage. The motor 6 drives a load (e.g., a compressor), which is not illustrated. In a case where the compressor is used as the load, the compressor may be mounted on an air conditioner, for example. FIG. 1 shows an equivalent circuit of the motor 6. In a specific example, an inductance component Lu and a resistance component Ru of a winding of a U phase are connected in series, and one end of the series-connected body is connected to the output terminal Pu. The same applies to windings of a V phase and a W phase. The other ends of these series-connected bodies are connected together.

A control device 10 outputs switch signals to the switches SL and Sc and the inverter 5 to control the power converter. A method of controlling the power converter will be described below.

<2. Control Method>

In such a power converter, the rectified voltage Vrec can be input into the inverter 5 when the switch Sc is not conducting. On the other hand, the voltage Vc across the capacitor C4 can be input into the inverter 5 when the switch Sc is conducting. That is to say, a DC voltage Vdc1 input into the inverter 5 matches the rectified voltage Vrec when the switch Sc is not conducting, and matches the voltage Vc when the switch Sc is conducting.

In the present embodiment, a time period T1 in which the switch Sc is maintained not conducting and a time period T2 in which the switch Sc is switched between conducting and not conducting are introduced. The time period T2 is a time period other than the time period T1. The time period T2 thus decreases with increasing time period T1.

Figure 2B:
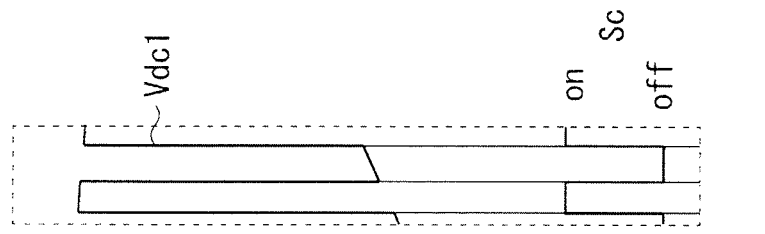
FIGS. 2A and 2B are diagrams schematically showing examples of various parameters in a first scheme.
Figure 2A:
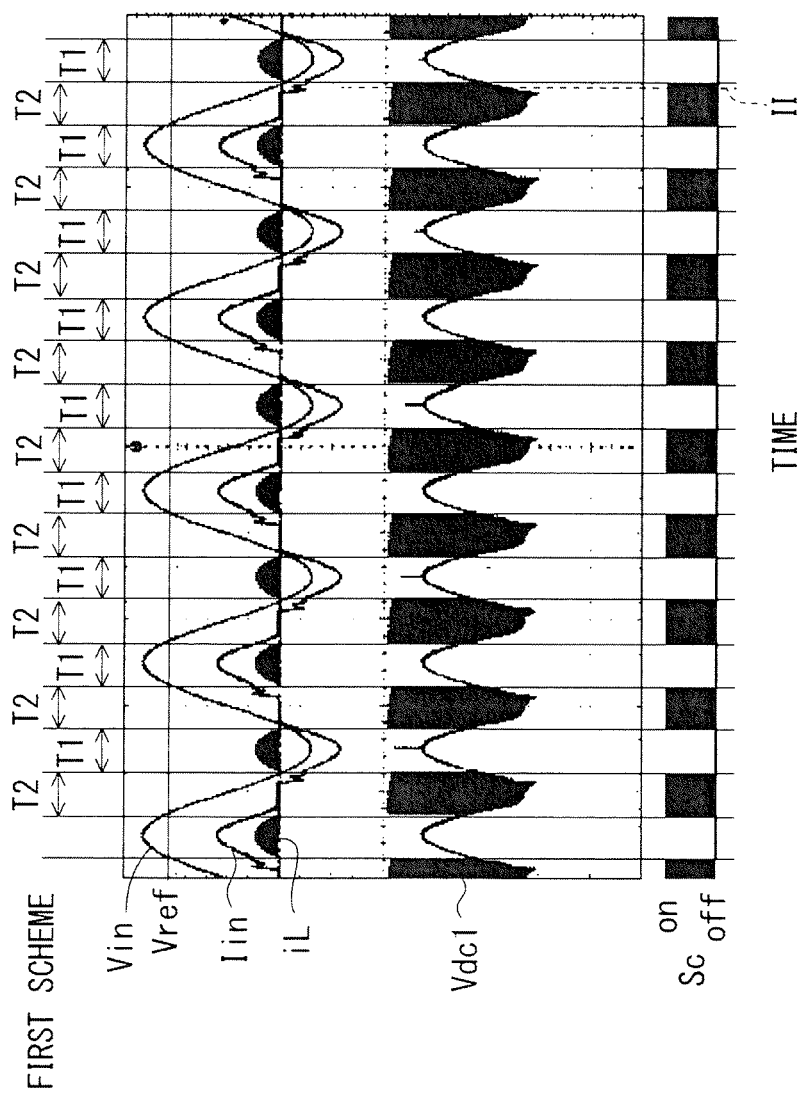

FIGS. 2A and 2B schematically show examples of the DC voltage Vdc1 input into the inverter 5 and a switch state of the switch Sc. In the example of FIG. 2A, the single-phase AC voltage Vin, the input current Iin, and a current iL flowing through the reactor L4 are also shown for reference. As illustrated in FIG. 2A, the switch Sc is maintained not conducting (off in FIG. 2A) in the time period T1. Thus, in the time period T1, the DC voltage Vdc1 matches the rectified voltage Vrec (=|Vin|).

In the example of FIG. 2A, the switch state is blackened in the time period T2. As illustrated in FIG. 2B that is an enlarged view of the time II, the switch Sc is repeatedly switched between conducting and not conducting in the time period T2. Thus, in the time period T2, the DC voltage Vdc1 matches the voltage Vc when the switch Sc is conducting, and matches the rectified voltage Vrec when the switch Sc is not conducting. In the time period T2, an average of the DC voltage Vdc1 can be controlled to be between the rectified voltage Vrec and the voltage Vc in accordance with a duty at which the switch Sc is conducting. This means that, in the time period T2, the average of the DC voltage Vdc1 can be increased above the rectified voltage Vrec. The average of the DC voltage Vdc1 herein refers to an average (hereinafter, also referred to as a first average) of the DC voltage Vdc1 in switching periods of the switch Sc, for example.

As described above, the DC voltage Vdc1 matches the rectified voltage Vrec in the time period T1, and the average of the DC voltage Vdc1 can be controlled to be a desired value higher than the rectified voltage Vrec in the time period T2.

The relationship between the maximum value of an average (hereinafter, referred to as a second average) of the DC voltage Vdc1 in a single period of the single-phase AC voltage Vin and the length of the time period T1 will be considered next. As described above, the DC voltage Vdc1 matches the rectified voltage Vrec in the time period T1, and the DC voltage Vdc1 can be controlled to be the value higher than the rectified voltage Vrec in the time period T2. The maximum value of the second average of the DC voltage Vdc1 can thus be increased with decreasing time period T1. Conversely, the maximum value of the second average of the DC voltage Vdc1 decreases with increasing time period T1.

In the present embodiment, the time period T1 is set to be shorter when a rotational speed ωm of the motor 6 is higher than a speed threshold than when the rotational speed ωm is lower than the speed threshold. When the rotational speed ωm is higher than the speed threshold, the time period T1 is set to be zero, for example. When zero is used as the time period T1, the DC voltage Vdc1 can be controlled to be maximized from a viewpoint of the length of the time period T1. Conversely, the time period T1 is set to be long when the rotational speed ωm is low.

Figure 3B:
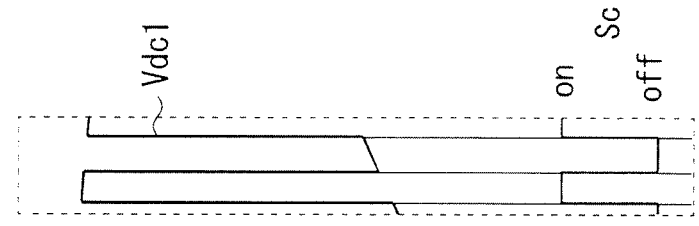
FIGS. 3A and 3B are diagrams schematically showing examples of various parameters in a second scheme.
Figure 3A:
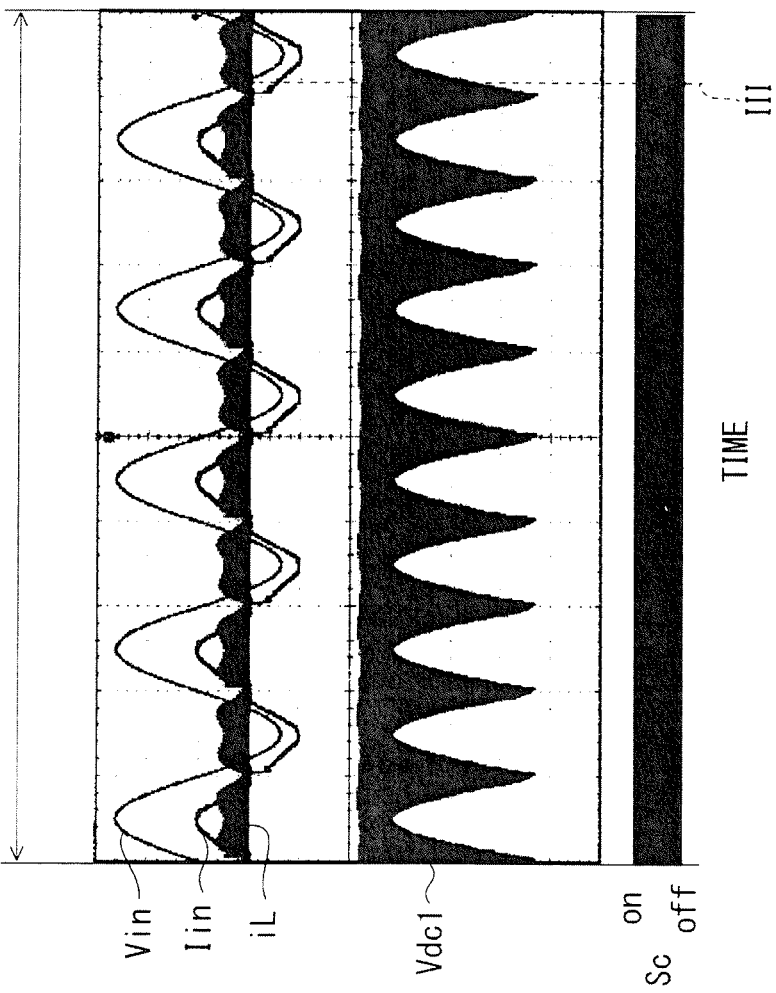

FIGS. 3A and 3B schematically show examples of the DC voltage Vdc1 and the switch state of the switch Sc when zero is used as the time period T1. Also in the example of FIG. 3A, the single-phase AC voltage Vin, the input current Iin, and the current iL are shown for reference. As illustrated in FIG. 3B that is an enlarged view of the time III, the switch Sc is repeatedly switched between conducting and not conducting in the entire time period (time period T2). The first average of the DC voltage Vdc1 can thus be higher than the rectified voltage Vrec in the entire time period.

Incidentally, the amplitude of the AC voltage applied to the motor 6 increases with increasing rotational speed ωm of the motor 6. The maximum value of the amplitude of the AC voltage that the inverter 5 can output to the motor 6 depends on the DC voltage Vdc1. Specifically, the maximum value increases with increasing DC voltage Vdc1. Thus, the DC voltage Vdc1 is not required to be increased when the rotational speed ωm is low.

In the present embodiment, the time period T1 is thus set to be long when the rotational speed ωm is low (e.g., FIG. 2A). This can reduce the maximum value of the second average of the DC voltage Vdc1 when the rotational speed ωm is low. If it is assumed that the duty in the time period T2 is not changed by the change of the length of the time period T1 for simplicity, for example, the second average of the DC voltage Vdc1 is reduced by extension of the time period T1.

When the time period T2 is reduced by increasing the time period T1 as described above, a time period in which the switch Sc can be conducting, that is, a time period in which the capacitor C4 can discharge decreases, and the amount of discharge can be reduced. The amount of charge and the amount of discharge of the capacitor C4 are controlled to be balanced, and thus the amount of charge of the capacitor C4 by the boost circuit 4*a* is reduced by reduction in amount of discharge. That is to say, a time period in which the switch SL is on is shorter when the rotational speed ωm is lower than the speed threshold than when the rotational speed ωm is higher than the speed threshold. This reduces a current flowing through the boost circuit 4a. Loss caused in the boost circuit 4a is thus also reduced. Thus, when the time period T1 is set to be long to reduce the DC voltage Vdc1, the motor 6 can be driven with higher efficiency compared with a case where the time period T1 is set to be short.

In contrast, the time period T1 is set to be short when the rotational speed ωm is high (e.g., FIG. 3A). This can increase the maximum value of the second average of the DC voltage Vdc1 when the rotational speed ωm is high. That is to say, the DC voltage Vdc1 can be controlled to be higher compared with a case where the time period T1 is set to be long. An AC voltage having larger amplitude can thus be output to the motor 6. This enables the motor 6 to be driven properly at a high rotational speed ωm.

When the amplitude of the AC voltage increases to the maximum value of the amplitude of the AC voltage that the inverter 5 can output, the rotational speed ωm can be increased, for example, by performing field weakening control (or flux weakening control, the same applies to the following). In the field weakening control, the amplitude of the AC current flowing through the motor 6 increases rapidly with increasing rotational speed ωm. The increase in current is undesirable, for example, because the current capacity of the circuit (the converter 3, the power buffer circuit 4, the inverter 5, and the motor 6) is required to be raised.

In the present embodiment, when the rotational speed ωm is higher than the speed threshold, the DC voltage Vdc1 can be controlled to be higher, and the inverter 5 can output the AC voltage having larger amplitude to the motor 6. Thus, a value of the rotational speed ωm that requires the field weakening control can be increased. This can reduce the amplitude of the AC current flowing through the motor 6. The current capacity that the circuit is required to have can be reduced, leading to reduction in manufacturing cost.

The configuration to perform the above-mentioned control will be described next. In the example of FIG. 1, a speed detection unit 9 and the control device 10 are provided. The speed detection unit 9 detects the rotational speed ωm of the motor 6. For example, AC currents iu, iv, and iw flowing through the motor 6 are input into the speed detection unit 9. The AC currents iu, iv, and iw are detected by a known current detection unit. The speed detection unit 9 calculates the rotational speed ωm of the motor 6 on the basis of the AC currents iu, iv, and iw, and outputs it to the control device 10.

The control device 10 includes a switch control unit 11 and a charge and discharge time period setting unit 12. The control device 10 herein includes a microcomputer and a storage device. The microcomputer performs processing steps (i.e., procedures) written in a program. The above-mentioned storage device can be formed by one or more various storage devices, such as read only memory (ROM), random access memory (RAM), rewritable non-volatile memory (e.g., erasable programmable ROM (EPROM)), and a hard disk drive. The storage device stores various pieces of information, data, and the like, stores the program executed by the microcomputer, and provides a work area for executing the program. The microcomputer can be understood to function as various units corresponding to the respective processing steps written in the program, or to achieve various functions corresponding to the respective processing steps. The control device 10 is not limited to this, and some or all of various procedures performed by the control device 10 or various units or various functions achieved by the control device 10 may be achieved by hardware.

The rotational speed ωm detected by the speed detection unit 9 is input into the charge and discharge time period setting unit 12. The charge and discharge time period setting unit 12 sets the length of the time period T1 (and, further, the time period T2) on the basis of the rotational speed ωm as described above, and outputs information M showing the length of the time period T1 to the switch control unit 11.

Figure 4:
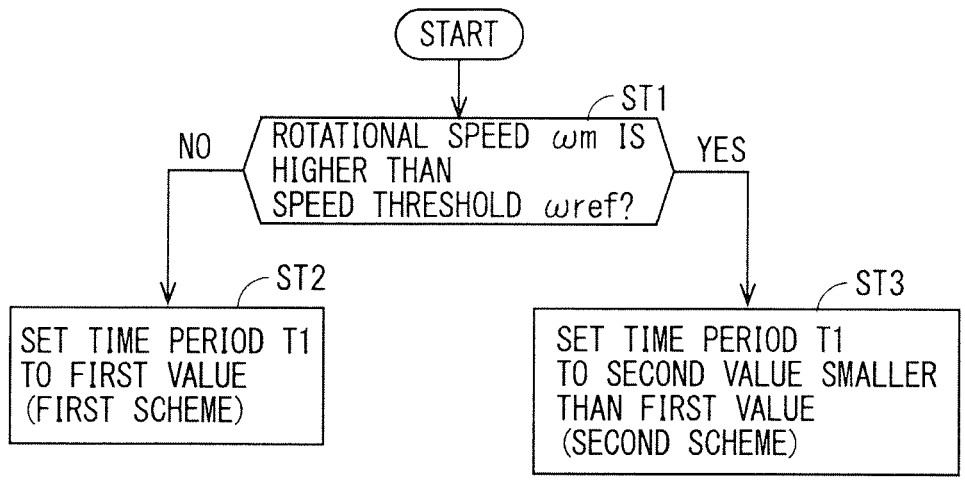
FIG. 4 is a flowchart showing an example of operation of a control unit.
Figure 5:
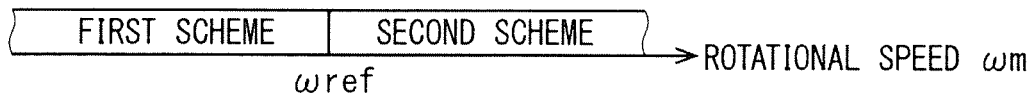
FIG. 5 is a diagram showing an example of operation.

FIG. 4 is a flowchart showing an example of operation of the charge and discharge time period setting unit 12, and FIG. 5 is a diagram for explaining the operation. As shown in FIG. 4, the charge and discharge time period setting unit 12 first determines whether the rotational speed ωm is higher than a speed threshold cord in step ST1. The speed threshold ωref is stored in a storage, for example, and the charge and discharge time period setting unit 12 reads it, and determines whether the rotational speed ωm is higher than the speed threshold ωref. The determination can be made, for example, using a comparator.

When determining that the rotational speed ωm is lower than the speed threshold ωref, the charge and discharge time period setting unit 12 determines the time period T1 as a first value in step ST2. Control based on the first value for the time period T1 is hereinafter also referred to as a first scheme. On the other hand, when determining that the rotational speed ωm is higher than the speed threshold ωref in step ST1, the charge and discharge time period setting unit 12 sets the time period T1 to a second value (e.g., zero) that is smaller than the first value in step ST3. Control based on the second value for the time period T1 is hereinafter also referred to as a second scheme. As a result, the first scheme is used when the rotational speed ωm is lower than the speed threshold ωref, and the second scheme is used when the rotational speed ωm is higher than the speed threshold ωref as shown in FIG. 5.

The switch control unit 11 generates control signals SSc, SSL, SSup, SSvp, SSwp, SSun, SSvn, and SSwn for the switches SL and Sc of the power buffer circuit 4 and the switching elements Sup, Sun, Svp, Svn, Swp, and Swn of the inverter 5, and outputs them to the power buffer circuit 4 and the inverter 5. Not only the information M but also various parameters (e.g., crest values Vm and Im, a power supply angular speed ω, and a d-axis current id and a q-axis current iq) and various command values (e.g., a rotational speed command value ωm*) required for control are input into the switch control unit 11, and the above-mentioned control signals are generated on the basis of them. Any of techniques described in Japanese Patent Application Laid-Open No. 2015-084637, Japanese Patent Application Laid-Open No. 2015-065731 and Japanese Patent Application Laid-Open No. 2015-076921 can be used as a method of generating the control signals, for example. A specific example of the control will be described below.

The time period T1 (e.g., FIG. 2A) when the rotational speed ωm is lower than the speed threshold ωref may be a time period in which the rectified voltage Vrec (=|Vin|) is greater than a voltage reference value Vref (e.g., 1/√2 of the crest value Vm). That is to say, the switch Sc is maintained not conducting when the rectified voltage Vrec is high. According to this, as illustrated in FIG. 2A, the rectified voltage Vrec near a peak value (crest value) appears as the DC voltage Vdc1 in the time period T1. On the other hand, when a time period in which the rectified voltage Vrec is smaller than the voltage reference value Vref is used as the time period T1, the rectified voltage Vrec near a bottom value (zero) appears as the DC voltage Vdc1 in the time period T1. That is to say, the DC voltage Vdc1 can be increased by using the time period in which the rectified voltage Vrec is greater than the voltage reference value Vref as the time period T1. This is desirable because the AC voltage from the single-phase AC power supply 1 is used effectively.

A plurality of speed thresholds may be provided. For example, the time period T1 may be set to the first value when the rotational speed ωin is lower than a first speed threshold, may be set to the second value (<the first value) when the rotational speed ωm is higher than the first speed threshold and is lower than a second speed threshold, and may be set to a third value (<the second value) when the rotational speed ωm is higher than the second speed threshold.

<2-1. Specific Control Method>

An example of specific control of the switches Sc and SL and the inverter 5 will be described below for reference. As an example, in the first scheme used when the rotational speed ωm is lower than the speed threshold ωref, the time period T1 is set to a time period in which the rectified voltage Vrec (=|Vin|) is greater than $1/\sqrt{2}$ of the crest value Vm (see FIG. 2A). In this case, the time periods T1 and T2 are switched each one-quarter period of the single-phase AC voltage Vin. On the other hand, the time period T1 is set to zero in the second scheme used when the rotational speed ωm is higher than the speed threshold ωref (see FIG. 3A).

<2-1-1. Basic Concept>

The concept common to the first scheme and the second scheme will be described first. Input power Pin input into the converter 3 is expressed by an equation shown below with an input power factor being 1. Note that the crest value Vm and the power supply angular speed ω of the single-phase AC voltage Vin, the crest value Im of the input current Iin, and time t are introduced. The product ωt of the power supply angular speed ω and the time t represents a phase angle of the single-phase AC voltage Vin. An AC waveform is understood as the product of a sine value of the phase angle ωt and the crest value of the AC waveform.

$$Pin = Vm \cdot Im \cdot \sin^2(\omega t) \quad (1)$$
$$= \frac{1}{2} Vm \cdot Im - \frac{1}{2} Vm \cdot Im \cdot \cos(2\omega t)$$

The second term of the rightmost side of the equation (1) indicates power ripple. A variation range of the input power Pin is the amplitude of the second term of the rightmost side of the equation (1), and is indicated by Vm·Im/2. Power that the converter 3 outputs to the DC link is ideally equal to the input power Pin input into the converter 3. The input power Pin can thus be understood as power input into the DC link. The power ripples as described above, and is thus hereinafter also referred to as ripple power Pin. To reduce ripple of DC power Pdc output from the DC link to the inverter 5, the power buffer circuit 4 should provide and receive power to and from the DC link so that the amplitude of the second term of the rightmost side of the equation (1) is reduced. The power provided and received by the power buffer circuit 4 is hereinafter referred to as buffer power Pbuf. The buffer power Pbuf is determined by the following equation, for example, by introducing a positive variable k equal to or smaller than 1.

$$Pbuf = \frac{k}{2} Vm \cdot Im \cdot \cos(2\omega t) \quad (2)$$

That is to say, the buffer power Pbuf is expressed by the product of a DC part (Vm·Im/2) of the input power Pin input from the single-phase AC power supply 1 (or further via the filter 2: the same applies to the following), a cosine value cos(2ωt) of a value (2ωt) that is twice the phase angle ωt, and the variable k.

The buffer power Pbuf takes a positive value in a second time period T12 in which the phase angle ωt of the single-phase AC voltage is 0 to π/4 inclusive, 3π/4 to 5π/4 inclusive, or 7π/4 to 2π inclusive, and takes a negative value in a first time period T11 other than the second time period T12. That is to say, the power buffer circuit 4 outputs the absolute value of the buffer power Pbuf to the DC link in the second time period T12, and receives the absolute value of the buffer power Pbuf from the DC link in the first time period T11.

The single-phase AC voltage Vin is expressed by Vm·sin(ωt), and thus, by describing the above-mentioned range in another way, it can also be said that the power buffer circuit 4 outputs positive power when the absolute value of the single-phase AC voltage Vin is smaller than a value that is $1/\sqrt{2}$ times the crest value Vm thereof, and outputs negative power when the absolute value of the single-phase AC voltage Vin is greater than the value that is $1/\sqrt{2}$ times the crest value Vm thereof.

The output power Pout output from the inverter 5 is expressed by an equation shown below using the input power Pin and the buffer power Pbuf. The DC power Pdc input into the inverter 5 and the output power Pout output from the inverter 5 are ideally equal to each other.

$$Pout = Pdc = Pin + Pbuf \quad (3)$$
$$= \frac{1}{2} Vm \cdot Im - \frac{1-k}{2} Vm \cdot Im \cdot \cos(2\omega t)$$

As shown in the second term of the rightmost side of the equation (3), a variation range of ripple of the output power Pout is indicated by (1−k)·Vm·Im/2. Since the variable k is greater than 0 and equal to or smaller than 1, the variation range is smaller than a variation range of the ripple power Pin (amplitude of the second term of the rightmost side of the equation (1)). That is to say, the power buffer circuit 4 provides and receives the buffer power Pbuf shown in the equation (2) to and from the DC link, so that the DC link outputs the DC power Pdc having a variation range smaller than the variation range of the ripple power Pin to the inverter 5. The variable k corresponds to a magnitude of a difference between the variation range of the ripple power Pin and the variation range of the DC power Pdc, and indicates a degree of reduction in power ripple. The power ripple is reduced as the variable k increases. It can be seen that, when an equation k=1 holds, for example, the ripple can be canceled out as the second term of the rightmost side of the equation (3) becomes zero. The variable k is hereinafter also referred to as a compensation rate k.

When the above-mentioned reduction in ripple is described qualitatively, the power buffer circuit 4 receives power from the DC link as an input to store the power when the ripple power Pin is large (in the first time period T11), and outputs power to the DC link when the ripple power Pin is small (in the second time period T12) to reduce the ripple of the DC power Pdc (=output power Pout) input into the inverter 5.

<2-1-2. Equivalent Circuit>

Figure 6:
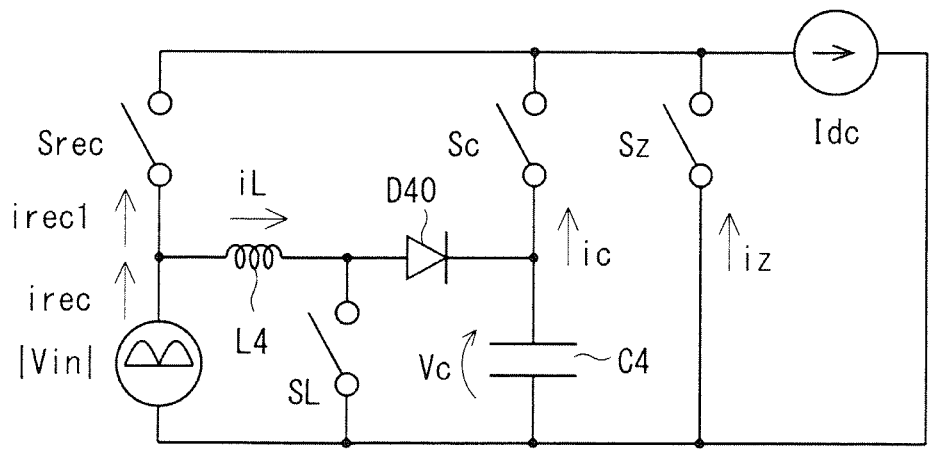
FIG. 6 is a diagram showing an example of an equivalent circuit.

FIG. 6 shows an equivalent circuit of the circuit shown in FIG. 1. In the equivalent circuit shown in FIG. 6, a current irec1 flowing from the converter 3 to the inverter 5 is equivalently expressed as a current irec1 passing through a switch Srec when the switch Srec is conducting. Similarly, a discharge current of the capacitor C4 is equivalently expressed as a current is passing through the switch Sc when the switch Sc is conducting. A current flowing to the motor 6 via the inverter 5 when the output terminals Pu, Pv, and Pw are connected in common to one of the DC power supply lines LH and LL in the inverter 5 is also equivalently expressed as a zero-phase current iz flowing through a switch Sz when the switch Sz is conducting. FIG. 6 shows the reactor L4, the diode D40, and the switch SL constituting the boost circuit 4a, and additionally shows the current iL flowing through the reactor L4.

In the equivalent circuit thus obtained, the following equation holds by introducing duties drec, dc, and dz at which the switches Srec, Sc, and Sz are respectively conducting and a DC current Idc input into the inverter 5.

$$\begin{pmatrix} irec \\ ic \\ iz \end{pmatrix} = \begin{pmatrix} drec & 1 \\ dc & 0 \\ dz & 0 \end{pmatrix} \cdot \begin{pmatrix} Idc \\ iL \end{pmatrix} \quad (4)$$

The currents irec1, ic, and iz are respectively obtained by multiplying the DC current Idc by the duties drec, dc, and dz, and thus are average values in switching periods of the respective switches Srec, Sc, and Sz. The current iL is similarly an average value in switching periods of the switch SL.

The DC current Idc is the sum of the currents irec1, ic, and iz respectively passing through the switches Srec, Sc, and Sz, and thus an equation shown below holds. Note that inequations $0 \leq drec \leq 1$, $0 \leq dc \leq 1$, and $0 \leq dz \leq 1$ hold.

$$drec + dc + dz = 1 \quad (5)$$

The duties drec, dc, and dz can thus be seen as current distribution ratios of the DC current Idc to the currents irec1, ic, and iz. The duty drec is a duty at which a time period in which the converter 3 is connected to the DC power supply lines LH and LL to allow a current to flow to the inverter 5 is set, and is thus hereinafter also referred to as a rectification duty drec. The duty dc is a duty at which the capacitor C4 discharges, and is thus hereinafter also referred to as a discharge duty dc. The duty dz is a duty at which the zero-phase current iz always flows in the inverter 5 regardless of a voltage output from the inverter 5, and is thus hereinafter also referred to as a zero duty dz.

The inverter 5 cannot use the DC voltage across the DC power supply lines LH and LL in a time period in which the zero-phase current iz flows. An imaginary DC voltage (hereinafter, referred to as an "imaginary DC voltage") Vdc of the DC voltage across the DC power supply lines LH and LL in a time period in which the inverter 5 can perform power conversion can thus be considered as shown below. The imaginary DC voltage Vdc can be understood as a voltage applied across the DC power supply lines LH and LL as an average of the maximum value of a voltage that the inverter 5 can output in a period in which switching of the switches Sc and SL and the inverter 5 is controlled.

$$Vdc = Vrec \cdot drec + Vc \cdot dc + 0 \cdot dz \quad (6)$$

<2-1-3. First Scheme>

The buffer power Pbuf takes the negative value in the first time period T11 as described above. That is to say, the power buffer circuit 4 receives the buffer power Pbuf from the DC link in the first time period T11. In this case, the power buffer circuit 4 is not required to output power to the DC link. This means that the capacitor C4 is not required to discharge to the DC link. Thus, the switch Sc may be maintained not conducting in the first time period T11. That is to say, the first time period T11 may be used as the above-mentioned time period T1. In this case, the discharge duty dc is maintained zero in the time period T1.

The buffer power Pbuf takes the positive value in the second time period T12 as described above. That is to say, in the second time period T12, the switch Sc is switched between conducting and not conducting, so that the capacitor C4 discharges to the DC link. In other words, the second time period T12 is used as the above-mentioned time period T2.

In the second time period T12, the power buffer circuit 4 is not required to receive power from the DC link. Thus, the switch SL may be maintained not conducting in the second time period T12. In other words, a boost duty dL at which the switch SL is conducting may be maintained zero in the second time period T12.

In such control, the power buffer circuit 4 only receives power, and does not provide power to the DC link in the first time period T11. On the other hand, the power buffer circuit 4 only provides power, and does not receive power from the DC link in the second time period T12.

<2-1-4. Second Scheme>

In contrast to the above-mentioned example, the power buffer circuit 4 may allow power provision and reception over the entire time period. This means that the power buffer circuit 4 provides and receives power to and from the DC link also in the first time period T11, but the power buffer circuit 4 receives the buffer power Pbuf shown in the equation (2) from the DC link as the balance of power in the first time period T11. That is to say, power PL that the power buffer circuit 4 receives from the DC link is larger than power Pc that the power buffer circuit 4 provides to the DC link in the first time period T11. Similarly, the power buffer circuit 4 provides the buffer power Pbuf shown in the equation (2) to the DC link as the balance of power in the second time period T12. That is to say, the power Pc is larger than the power PL in the second time period T12. In this scheme, the switch Sc is switched between conducting and not conducting over the entire time period. This scheme thus corresponds to a case where the time period T1 in which the switch Sc is maintained not conducting is set to zero in the above-mentioned second scheme. This means that the entire time period corresponds to the time period T2 in which the switch Sc is repeatedly switched between conducting and not conducting.

<2-1-4-1. Specific Control Method in First Scheme>

The method of generating the control signals described in Japanese Patent Application Laid-Open No. 2015-065731 will be described herein. A ratio of the imaginary DC voltage Vdc to the crest value Vm is first introduced as a voltage utilization ratio R. An increase in voltage utilization ratio R means an increase in use of the single-phase AC voltage Vin. The rectification duty drec and the discharge duty dc to maximize the voltage utilization ratio R are set by the equation (6) and an equation (7) in the first time period T11 (time period T1). This, however, is setting to maximize the voltage utilization ratio R in a case where the imaginary DC voltage Vdc is constant as suggested in Japanese Patent Application Laid-Open No. 2015-065731. The voltage utilization ratio R is $(1/\sqrt{2})$ in this case. In the first time period T11 (time period T1), an equation dc=0 holds, and thus the switch Sc is not conducting. In the second time period T12 (time period T2), the capacitor C4 is not charged, and thus the current iL does not flow (see also FIG. 2A).

$$drec = \sqrt{2}\,|\sin(\omega t)|$$
$$dc = \frac{Vm}{vc} \cdot \frac{\cos(2\omega t)}{\sqrt{2}} \quad (7)$$

$$drec = \frac{1}{\sqrt{2}\,|\sin\cdot(\omega t)|}$$
$$dc = 0 \quad (8)$$

In this "first setting", the DC current Idc input into the inverter 5 is allowed to ripple to obtain the buffer power Pbuf satisfying the equation (2) while maintaining the above-mentioned voltage utilization ratio R, that is, while maintaining the duties in the equations (7) and (8).

Specifically, the DC current Idc satisfying an equation shown below is input into the inverter 5. Control of the inverter 5 for satisfying the equation shown below can be achieved by controlling a current command value. Control of the current command value will be described below.

$$Idc = \frac{Vm \cdot Im}{2 \cdot Vdc}(1-(1-k)\cos(2\omega t)) \quad (9)$$

In the second time period T12 (time period T2), the current iL is zero as described above, and thus a current irec is equal to the current irec1, and is equal to the product drec·Idc. Thus, an equation shown below holds. Note that an equation Vm/Vdc=$\sqrt{2}$ is used in view of the voltage utilization ratio R.

$$irec = irec1 = drec \cdot Idc \quad (10)$$
$$= \sqrt{2}\,|\sin(\omega t)| \cdot \frac{Vm \cdot Im}{2 \cdot Vdc} \cdot (1-(1-k)\cos(2\omega t))$$
$$= Im|\sin(\omega t)| \cdot (1-(1-k)\cos(2\omega t))$$

The current irec appears as the absolute value of the input current Iin, and thus the input current Iin differs from a sinusoidal current. In the present embodiment, the crest value Im is thus a crest value of a current having a sinusoidal waveform with an rms value of the input current Iin (i.e., a time average of the square of the input current Iin) as its rms value.

In the equation (10), however, when an equation $\cos(2\omega t)$ =0 holds independently of the value k, an equation $|\sin(\omega t)|=1/\sqrt{2}$ holds, and the current irec takes a value $Im/\sqrt{2}$. In the present embodiment, the crest value Im of the current irec can be understood as a value that is $\sqrt{2}$ times a value that the current irec (i.e., the absolute value of the current Iin) takes when the phase angle $\omega t$ is $\pi/4$ or $3\pi/4$ (i.e., at the boundary between the second time period T12 and the first time period T11).

From the equation (10), power input from the single-phase AC power supply 1 in the second time period T12 (time period T2) is obtained by an equation (11):

$$Pin = Vm \cdot Im \cdot \sin^2(\omega t) \cdot (1-(1-k)\cos(2\omega t)) \quad (11)$$

On the other hand, power input into the inverter 5, that is, the output power Pout consumed by the inverter 5 is obtained as the product of the DC current Idc and the imaginary DC voltage Vdc, and is obtained by an equation (12):

$$Pout = Vdc \cdot Idc \quad (12)$$
$$= \frac{Vm \cdot Im}{2}(1-(1-k)\cos(2\omega t))$$

When a difference between the equations (11) and (12) is obtained, an equation (13) holds, and matches the equation (2).

$$Pout - Pin = \frac{Vm \cdot Im}{2}[(1-(1-k)\cos(2\omega t)) - \sin^2(\omega t)] \quad (13)$$
$$= \frac{k \cdot Vm \cdot Im}{2} \cdot \cos(2\omega t)$$

The validity of setting the DC current Idc by the equation (9) is thus explained.

In the first time period T11 (time period T1), the current iL is set as shown in an equation (14). Accordingly, power stored in the power buffer circuit 4 in the first time period T11 (time period T1) is calculated as shown in an equation (15), and is equal in absolute value and has polarity opposite to that in the equation (2), which shows the buffer power Pbuf. It can thus be understood that setting the current iL by the equation (14) is valid.

$$iL = k \cdot Im \cdot \left[|\sin(\omega t)| - \frac{1}{2|\sin(\omega t)|}\right] \quad (14)$$

$$|Vin| \cdot iL = Vm|\sin(\omega t)| \cdot k \cdot Im \cdot \left[|\sin(\omega t)| - \frac{1}{2|\sin(\omega t)|}\right] \quad (15)$$
$$= Vm \cdot Im \cdot k \cdot \left[\sin^2(\omega t) - \frac{1}{2}\right]$$
$$= \frac{1}{2}Vm \cdot Im \cdot k \cdot [-\cos(2\omega t)]$$

The current iL is controlled on the basis of whether the switch SL is conducting or not. That is to say, the current iL can have a value shown in the equation (14) through appropriate control of the switch SL. Control of the switch SL for causing the current iL to have a value closer to a desired value is known as control of a boost chopper circuit, and thus detailed description thereof is omitted.

The duties drec, dc, and dz to control the switches Srec, Sc, and Sz are provided by the equations (5), (7), and (8). The switch Srec, however, is not actually provided, and only appears in the equivalent circuit. The switch Srec is thus equivalently controlled by controlling the switch Sc and the inverter 5 respectively on the basis of the duty dc and the duty dz. That is to say, whether the switch Sc is conducting or not is controlled on the basis of the duty dc shown in the equation (7) in the second time period T12, and the switch Sc is controlled to be not conducting on the basis of the duty dc shown in the equation (8) in the first time period T11.

In the second time period T12, the inverter 5 is caused to use a zero voltage vector on the basis of the zero duty dz obtained by the equations (5) and (7). The zero voltage vector is a voltage vector when all the switching elements Sup, Svp, and Swp or all the switching elements Sun, Svn, and Swn are not conducting. In the first time period T11, the inverter 5 is caused to use the zero voltage vector on the basis of the zero duty dz obtained by the equations (5) and (8).

As described above, the switches Srec, Sc, and Sz can equivalently be caused to be conducting respectively on the basis of the duties drec, dc, and dz through control of the switches SL and Sc and the inverter 5. This leads to reduction in ripple of the DC power Pdc.

In this first scheme, the voltage utilization ratio R is maximized as described above, but a value thereof is $1/\sqrt{2}$. That is to say, the maximum value of the imaginary DC voltage Vdc is $1/\sqrt{2}$ of the crest value Vm.

<2-1-5. Second Scheme>

A case where the switch Sc is switched between conducting and not conducting over the entire time period in the second scheme will be described next. The method of generating the control signals described in Japanese Patent Application Laid-Open No. 2015-084637 will be described herein. The buffer power Pbuf is expressed by a difference (Pc−PL) between the power PL input from the DC link into the power buffer circuit 4 and the power Pc output from the power buffer circuit 4 to the DC link. The capacitor C4 is charged when the power PL is input from the DC link into the power buffer circuit 4, and thus the power PL is hereinafter also referred to as charge power PL. On the other hand, the capacitor C4 discharges when the power Pc is output from the power buffer circuit 4 to the DC link, and thus the power Pc is hereinafter also referred to as discharge power Pc.

As examples of the above-mentioned charge power PL and discharge power Pc, they are determined by the following equations (16) and (17):

$$PL = k1 \cdot Vm \cdot Im \cdot \sin^2(\omega t) \tag{16}$$

$$Pc = k1 \cdot Vm \cdot Im \cdot \cos^2(\omega t) \tag{17}$$
$$= k1 \cdot Vm \cdot Im \cdot \cos(2\omega t) + PL$$

One half of the compensation rate k is k1. The charge power PL is power that is k1 times the input power Pin as shown in the equation (16), and the discharge power Pc is power that is obtained by adding the charge power PL to power that is (−2·k1) times an AC component of the input power Pin as shown in the equation (17).

It is obvious, from the equations (16) and (17) and an equation Pbuf=Pc−PL, that the equation (2) is satisfied.

In contrast to Japanese Patent Application Laid-Open No. 2015-065731 and Japanese Patent Application Laid-Open No. 2015-076921 in which the charge power PL and the discharge power Pc as described above are provided and received between the power buffer circuit 4 and the DC link in exclusive time periods (the time period T1 and the time period T2) in a power supply phase, the exclusive time periods in the power supply phase are not set.

However, discharge is dominant over charge in the second time period (hereinafter, also referred to as a "discharge dominant time period") T12 in which an inequation Pc>PL (i.e., Pbuf>0) holds, and charge is dominant over discharge in the first time period T11 (hereinafter, also referred to as a "charge dominant time period") in which an inequation Pc<PL (i.e., Pbuf<0) holds. As understood from the equation (17), a time period in which an inequation (n+¼)π≤ωt≤(n+¾)π holds is the charge dominant time period, and a time period in which an inequation (n+¾)π≤ωt≤(n+5/4)π holds is the discharge dominant time period (n is an integer: the same applies to the following).

In the second scheme, the time period T1 is zero, and both the first time period T11 and the second time period T12 are included in the time period T2.

An art for setting the current irec1 flowing from the converter 3 to the inverter 5 of the current irec output from the converter 3 dependently of the value k1 (=one half of the compensation rate k) will be described next.

The rectified voltage Vrec shown in an equation (18) is applied to an output of the converter 3.

$$Vrec=|Vin|=Vm \cdot |\sin(\omega t)| \tag{18}$$

Power Prec directly heading from the converter 3 to the inverter 5 is obtained by subtracting the charge power PL from the input power Pin. That is to say, an equation Prec=Pin−PL holds, and thus the following equation (19) holds.

$$Prec=(1-k1) \cdot Vm \cdot Im \cdot \sin^2(\omega t)=|Vin| \cdot irec1 \tag{19}$$

The current irec1 is thus expressed by the following equation (20):

$$irec1=(1-k1) \cdot Im \cdot |\sin(\omega t)| \tag{20}$$

The equation (1) is based on the assumption that the input current Iin is expressed by Im·sin(ωt), that is, the input current Iin has a sinusoidal waveform, and thus the current iL satisfies an equation (21) shown below. This is because, as can be seen from FIG. 1, the current irec output from the converter 3 is equal to the sum of the current irec1 and the current iL.

$$iL=k1 \cdot Im \cdot |\sin(\omega t)| \tag{20}$$

The discharge power Pc output from the power buffer circuit 4 is expressed by the product Vc·ic by introducing the discharge current ic flowing from the capacitor C4 to the inverter 5. The discharge current ic should satisfy the following equation (22) so that the discharge power Pc satisfies the equation (17).

$$ic = \frac{Pc}{Vc} = \frac{k1 \cdot Vm \cdot Im}{2Vc}(1 + \cos(2\omega t)) \tag{22}$$

The rectification duty drec and the discharge duty dc are respectively set by the following equations (23) and (24) from the equations (20), (22), and (4).

$$drec = (1-k1) \cdot \frac{Im}{Idc} \cdot |\sin(\omega t)| \tag{23}$$

$$dc = k1 \cdot \frac{Vm}{2Vc} \cdot \frac{Im}{Idc} \cdot (1 + \cos(2\omega t)) \tag{24}$$

That is to say, the equations (20), (22), (23), and (24) are used upon request for the balance of power, and the equation (21) is used upon further request to make the input current Iin sinusoidal so that the equation (1) on which the above-mentioned various equations are based is satisfied.

In a case where the converter 3 uses the diode bridge, the converter 3 cannot actively perform switching at the rectification duty drec shown by the equation (23) as described above. The current irec1 shown by the equation (20) can thus be obtained by the inverter 5 and the switch Sc performing switching respectively in accordance with the zero duty dz and the discharge duty dc determined by the equations (23), (24), and (5).

Incidentally, the DC power Pdc input from the DC link into the inverter 5 is the product of the imaginary DC voltage Vdc and the DC current Idc. The inverter 5 obtains, from the DC link, the DC power Pdc (=Pin+Pc−PL) obtained by subtracting the charge power PL from the sum of the ripple power Pin and the discharge power Pc, and thus the following equation (25) holds.

$$Idc = \frac{Pin + Pc - PL}{Vdc} \qquad (25)$$
$$= \frac{Vm \cdot Im}{2}(1 - (1 - 2 \cdot k1)\cos(2\omega t)) \cdot \frac{1}{Vdc}$$

Note that neither the imaginary DC voltage Vdc nor the DC current Idc is limited in setting so far. That is to say, once the value k1 (=one half of the compensation rate k) is determined, the duties drec, dc, and dz can be set whatever the imaginary DC voltage Vdc and the DC current Idc are set as long as they satisfy the equation (25).

In Japanese Patent Application Laid-Open No. 2015-084637, the duties drec, dc, and dz are calculated by further adding conditions to maximize the voltage utilization ratio (=Vdc/Vm). For example, the duty dz is set to zero. This is because, as can be understood from the equations (5) and (6), the imaginary DC voltage Vdc is maximized when the zero duty dz is zero.

When the zero duty dz is zero, an equation (26) can be obtained from the equations (5), (23), and (24).

$$\frac{Im}{Idc}\{(1-k1) \cdot |\sin(\omega t)| + \frac{k1 \cdot Vm}{2Vc}(1+\cos(2\omega t))\} = 1 \qquad (26)$$

The zero duty dz is a duty at which all the switching elements Sup, Svp, and

Swp or all the switching elements Sun, Svn, and Swn are turned on in the inverter 5. The discharge duty dc is a duty at which the switch Sc is turned on, and the boost duty dL is a duty at which the switch SL is turned on. For example, the switch control unit 11 generates the control signals for the inverter 5 and the power buffer circuit 4 on the basis of each of the duties dz, dc, and dL. For example, each control signal is generated on the basis of comparison between each duty and a carrier.

In Japanese Patent Application Laid-Open No. 2015-084637, the control signals for the inverter 5 are generated as described below. First, a deviation of the rotational speed ωm from the rotational speed command value ωm* is calculated, and proportional integral control is performed on the deviation Δω. In parallel with this, the output power Pout is calculated on the basis of the AC currents iu, iv, and iw and the AC voltage (command value) of the motor 6, and a ripple component thereof is extracted. A deviation ΔP of the ripple component from a target ripple component (i.e., the second term of the rightmost side of the equation (3)) is calculated, and proportional integral control is performed on the deviation ΔP. Next, a result of the proportional integral control performed on the deviation Δω and a result of the proportional integral control performed on the deviation ΔP are added to generate a current command value. The control signals for controlling the inverter 5 are generated on the basis of the current command value. Generation of the control signals based on the current command value is known, and thus detailed description thereof is omitted.

In the second scheme, the imaginary DC voltage Vdc can be maintained at a constant of the crest value Vm, for example, by adjusting each of the duties drec, dc, dz, and dL. On the other hand, in the first scheme, the equation dc=0 holds in the first time period T11 (time period T1), and thus the imaginary DC voltage Vdc cannot be higher than the rectified voltage Vrec (see the equation (6)). In the case of FIG. 2A, for example, the maximum value of the imaginary DC voltage Vdc is 1/√2 of the crest value Vm as described above. The imaginary DC voltage Vdc can thus be increased more in the second scheme.

In the above-mentioned example, the time period T1 is set to be shorter when the rotational speed is higher than the speed threshold than when the rotational speed is lower than the speed threshold. As described above, there is a substantially positive correlation between the rotational speed and the amplitude of the AC voltage applied to the motor 6. The charge and discharge time period setting unit 12 may set the time period T1 so that the time period T1 is reduced when the amplitude of the AC voltage applied to the motor 6 reaches an upper limit. That is to say, a value of the rotational speed ωm when the amplitude of the AC voltage applied to the motor 6 reaches the upper limit may be used as the speed threshold ωref. The upper limit is determined by the DC voltage Vdc1. The fact that the amplitude has reached the upper limit can be detected through comparison between the amplitude of the AC voltage and the DC voltage Vdc1.

By setting the time period T1 so that the time period T1 is reduced when the amplitude of the AC voltage applied to the motor 6 reaches the upper limit, the DC voltage Vdc1 can be increased to increase the upper limit of the amplitude of the AC voltage that can be output to the motor 6 to thereby further increase the rotational speed ωm. Thus, the rotational speed can be increased without using the field weakening (magnetic flux weakening) control. As the amplitude, a command value on the AC voltage output from the inverter 5 may be used. That is to say, the time period T1 may be set to be reduced when an amplitude command value on the AC voltage reaches an upper limit (e.g., the DC voltage Vdc1).

Although control is performed on the basis of the equation (3) in the above-mentioned example, control is not limited to this.

While the power converter control device has been described in detail, the foregoing description is in all aspects illustrative, and does not limit the power converter control device. It is therefore understood that numerous modifications not having been described can be devised without departing from the scope of the power converter control device.

The invention claimed is:
1. A power converter control device for controlling a discharge switch in a power converter including first and second DC power supply lines, a rectifying circuit, said discharge switch and a capacitor, a boost circuit, and an inverter, said rectifying circuit full-wave rectifying a single-phase AC voltage to a rectified voltage, and applying said rectified voltage across said first and second DC power supply lines, said discharge switch and said capacitor being connected in series to each other between said first and second DC power supply lines, said boost circuit boosting said rectified voltage to charge said capacitor, said inverter receiving, as an input, said rectified voltage as a DC voltage across said first and second DC power supply lines when said discharge switch is not conducting, receiving, as an input, a voltage across said capacitor as said DC voltage when said discharge switch is conducting, converting said DC voltage as input into an AC voltage, and outputting said AC voltage to a motor, said power converter control device comprising:
- a switch control unit that maintains said discharge switch not conducting over a first time period, and switches said discharge switch between conducting and not conducting in a second time period other than said first time period; and
- a charge and discharge time period setting unit that sets said first time period when a rotational speed of said motor is higher than a speed threshold shorter than said first time period when said rotational speed is lower than said speed threshold.

2. The power converter control device according to claim 1, wherein when said rotational speed is higher than said speed threshold, said first time period has a length of zero.

3. The power converter control device according to claim 2, wherein when said rotational speed is lower than said speed threshold, said first time period is a time period in which said rectified voltage is greater than a predetermined value.

4. The power converter control device according to claim 3, wherein said speed threshold is said rotational speed when amplitude of said AC voltage applied to said motor reaches an upper limit.

5. The power converter control device according to claim 2, wherein said speed threshold is said rotational speed when amplitude of said AC voltage applied to said motor reaches an upper limit.

6. The power converter control device according to claim 1, wherein when said rotational speed is lower than said speed threshold, said first time period is a time period in which said rectified voltage is greater than a predetermined value.

7. The power converter control device according to claim 6, wherein said speed threshold is said rotational speed when amplitude of said AC voltage applied to said motor reaches an upper limit.

8. The power converter control device according to claim 1, wherein said speed threshold is said rotational speed when amplitude of said AC voltage applied to said motor reaches an upper limit.

* * * * *